US011828598B1

(12) United States Patent
Mastrangelo et al.

(10) Patent No.: US 11,828,598 B1
(45) Date of Patent: Nov. 28, 2023

(54) SYSTEMS AND METHODS FOR THE EFFICIENT DETECTION AND TRACKING OF OBJECTS FROM A MOVING PLATFORM

(71) Applicant: Ball Aerospace & Technologies Corp., Boulder, CO (US)

(72) Inventors: John Mastrangelo, Boulder, CO (US); Thomas E. Vaughan, Longmont, CO (US)

(73) Assignee: Ball Aerospace & Technologies Corp., Boulder, CO (US)

( * ) Notice: Subject to any disclaimer, the term of this patent is extended or adjusted under 35 U.S.C. 154(b) by 406 days.

(21) Appl. No.: 17/005,809

(22) Filed: Aug. 28, 2020

Related U.S. Application Data

(60) Provisional application No. 62/892,867, filed on Aug. 28, 2019.

(51) Int. Cl.
*G01C 21/02* (2006.01)
*G06V 10/22* (2022.01)
*G06V 10/75* (2022.01)
*G06V 20/64* (2022.01)

(52) U.S. Cl.
CPC ........... *G01C 21/025* (2013.01); *G06V 10/22* (2022.01); *G06V 10/751* (2022.01); *G06V 20/64* (2022.01)

(58) Field of Classification Search
CPC .... G01C 21/025; G06V 20/64; G06V 10/751; G06V 10/22
USPC ........................................................ 701/513
See application file for complete search history.

(56) References Cited

U.S. PATENT DOCUMENTS

| 5,719,794 A | 2/1998 | Altshuler et al. |
| 5,960,391 A | 9/1999 | Tateishi et al. |
| 6,075,991 A | 6/2000 | Raleigh et al. |
| 6,437,692 B1 | 8/2002 | Petite et al. |

(Continued)

FOREIGN PATENT DOCUMENTS

| CN | 108875595 | 11/2018 |
| CN | 108985372 | 12/2018 |

OTHER PUBLICATIONS

U.S. Appl. No. 16/745,725, filed Jan. 17, 2020, Tchilian et al.
(Continued)

*Primary Examiner* — Daniel L Greene
*Assistant Examiner* — Robert Louis Pinkerton
(74) *Attorney, Agent, or Firm* — Sheridan Ross P.C.

(57) ABSTRACT

Optical image sensor systems and process for simultaneously tracking multiple stationary or moving objects to provide attitude and geolocation information are provided. The objects are detected and tracked within subframe areas defined within a field of view of the image sensor system. Multiple objects within the field of view can be detected and tracked using parallel processing streams. Processing subframe areas can include applying precomputed detector data to image data. Image data within each subframe area obtained from a series of image frames is aggregated to enable the centroid of an object within a particular subframe to be located. Information from an inertial measurement unit can be applied to maintain a stationary object, such as a star, at the center of a respective subframe. Ephemeris data can be applied in combination with the information from the IMU to track a resident space object traversing a known trajectory.

16 Claims, 12 Drawing Sheets

(56) References Cited

U.S. PATENT DOCUMENTS

| | | | |
|---|---|---|---|
| 6,597,394 B1 | 7/2003 | Duncan et al. | |
| 6,820,053 B1 | 11/2004 | Ruwisch | |
| 7,020,501 B1 | 3/2006 | Elliott et al. | |
| 7,590,098 B2 | 9/2009 | Ganesh | |
| 8,019,544 B2 | 9/2011 | Needelman et al. | |
| 8,583,371 B1 | 11/2013 | Goodzeit et al. | |
| 8,929,936 B2 | 1/2015 | Mody et al. | |
| 9,073,648 B2 | 7/2015 | Tsao et al. | |
| 9,191,587 B2 | 11/2015 | Wright et al. | |
| 9,294,365 B2 | 3/2016 | Misra et al. | |
| 9,449,374 B2 | 9/2016 | Nash et al. | |
| 9,702,702 B1 | 7/2017 | Lane et al. | |
| 9,924,522 B2 | 3/2018 | Gulati et al. | |
| 9,927,510 B2 | 3/2018 | Waldron et al. | |
| 10,021,313 B1 | 7/2018 | Chen et al. | |
| 10,027,893 B2* | 7/2018 | Bell | H04N 5/23254 |
| 10,048,084 B2 | 8/2018 | Laine et al. | |
| 10,271,179 B1 | 4/2019 | Shima | |
| 10,469,725 B2* | 11/2019 | Prasad | H04N 23/60 |
| 10,761,182 B2 | 9/2020 | Tchilian | |
| 10,970,520 B1 | 4/2021 | Kim et al. | |
| 2004/0190762 A1 | 9/2004 | Dowski et al. | |
| 2005/0018162 A1* | 1/2005 | Leenders | G03F 7/70258 355/71 |
| 2005/0049876 A1 | 3/2005 | Agranat | |
| 2005/0213096 A1* | 9/2005 | Kouris | G06V 10/88 356/388 |
| 2005/0228660 A1 | 10/2005 | Schweng | |
| 2006/0030332 A1 | 2/2006 | Carrott et al. | |
| 2006/0238623 A1* | 10/2006 | Ogawa | H04N 1/212 348/E9.01 |
| 2007/0010956 A1 | 1/2007 | Nerguizian et al. | |
| 2008/0020354 A1 | 1/2008 | Goree et al. | |
| 2008/0045235 A1 | 2/2008 | Kennedy et al. | |
| 2008/0293353 A1 | 11/2008 | Mody et al. | |
| 2009/0179142 A1 | 7/2009 | Duparre et al. | |
| 2009/0197550 A1 | 8/2009 | Huttunen et al. | |
| 2009/0268619 A1 | 10/2009 | Dain et al. | |
| 2010/0091017 A1 | 4/2010 | Kmiecik et al. | |
| 2012/0071105 A1 | 3/2012 | Walker et al. | |
| 2012/0072986 A1 | 3/2012 | Livsics et al. | |
| 2012/0163355 A1 | 6/2012 | Heo et al. | |
| 2012/0167144 A1 | 6/2012 | Avison-Fell | |
| 2012/0202510 A1 | 8/2012 | Singh | |
| 2012/0238201 A1 | 9/2012 | Du et al. | |
| 2012/0238220 A1 | 9/2012 | Du et al. | |
| 2014/0063061 A1* | 3/2014 | Reitan | G09G 5/14 345/633 |
| 2014/0218520 A1 | 8/2014 | Teich et al. | |
| 2014/0232871 A1 | 8/2014 | Kriel et al. | |
| 2014/0282783 A1 | 9/2014 | Totten et al. | |
| 2014/0329540 A1 | 11/2014 | Duggan et al. | |
| 2015/0009072 A1 | 1/2015 | Nijsure | |
| 2015/0358546 A1* | 12/2015 | Higashiyama | H04N 5/2351 348/208.2 |
| 2016/0101779 A1 | 4/2016 | Katoh | |
| 2016/0173241 A1 | 6/2016 | Goodson et al. | |
| 2016/0187477 A1 | 6/2016 | Wang | |
| 2016/0198141 A1 | 7/2016 | Fettig et al. | |
| 2016/0227138 A1* | 8/2016 | Kozlowski | H01L 27/14609 |
| 2016/0292865 A1* | 10/2016 | Floor | H04N 23/90 |
| 2016/0379374 A1* | 12/2016 | Sokeila | H04N 5/23254 348/43 |
| 2017/0120906 A1 | 5/2017 | Penilla et al. | |
| 2017/0123429 A1 | 5/2017 | Levinson et al. | |
| 2017/0131096 A1* | 5/2017 | Karlov | G01C 21/02 |
| 2017/0366264 A1 | 12/2017 | Riesing et al. | |
| 2018/0019910 A1 | 1/2018 | Tsagkaris et al. | |
| 2018/0025641 A1 | 1/2018 | LaVelle et al. | |
| 2018/0053108 A1 | 2/2018 | Olabiyi et al. | |
| 2018/0082438 A1 | 3/2018 | Simon et al. | |
| 2018/0107215 A1 | 4/2018 | Djuric et al. | |
| 2018/0121767 A1 | 5/2018 | Wang et al. | |
| 2018/0149730 A1 | 5/2018 | Li et al. | |
| 2018/0268571 A1 | 9/2018 | Park et al. | |
| 2018/0293893 A1 | 10/2018 | Yang et al. | |
| 2018/0324595 A1 | 11/2018 | Shima | |
| 2019/0049955 A1 | 2/2019 | Yabuuchi et al. | |
| 2019/0122689 A1 | 4/2019 | Jain et al. | |
| 2019/0164430 A1 | 5/2019 | Nix | |
| 2019/0213887 A1 | 7/2019 | Kitayama et al. | |
| 2019/0222752 A1* | 7/2019 | Burstein | H04N 5/349 |
| 2019/0322282 A1 | 10/2019 | Theodosis et al. | |
| 2019/0363430 A1 | 11/2019 | Wang et al. | |
| 2020/0174094 A1* | 6/2020 | Tchilian | G01S 3/7803 |
| 2020/0333140 A1* | 10/2020 | Elson | G01S 13/89 |

OTHER PUBLICATIONS

"Deep Learning Meets DSP: OFDM Signal Detection," KickView Tech Blog, Feb. 13, 2018, 25 pages [retrieved online from: blog.kickview.com/deep-learning-meets-dsp-ofdm-signal-detection/].

Buchheim "Astronomical Discoveries You Can Make, Too!" Springer, 2015, pp. 442-443.

Ma et al. "Attitude-correlated frames approach for a star sensor to improve attitude accuracy under highly dynamic conditions," Applied Optics, Sep. 2015, vol. 54, No. 25, pp. 7559-7566.

Ma et al. "Performance Analysis of the Attitude-correlated Frames Approach for Star Sensors," IEEE, 3rd IEEE International Workshop on Metrology for Aerospace (MetroAeroSpace), Firenze, Italy, Jun. 22-23, 2016, pp. 81-86.

Nair et al. "Accelerating Capsule Networks with Tensor Comprehensions," Princeton, May 2018, 8 pages.

Ni et al. "Attitude-correlated frames adding approach to improve signal-to-noise ratio of star image for star tracker," Optics Express, May 2019, vol. 27, No. 11, pp. 15548-15564.

Wang "Research on Pruning Convolutional Neural Network, Autoencoder and Capsule Network," before Oct. 9, 2018, 11 pages.

Wang et al. "An Optimization View on Dynamic Routing Between Capsules," ICLR 2018 Workshop, Feb. 2018, 4 pages.

* cited by examiner

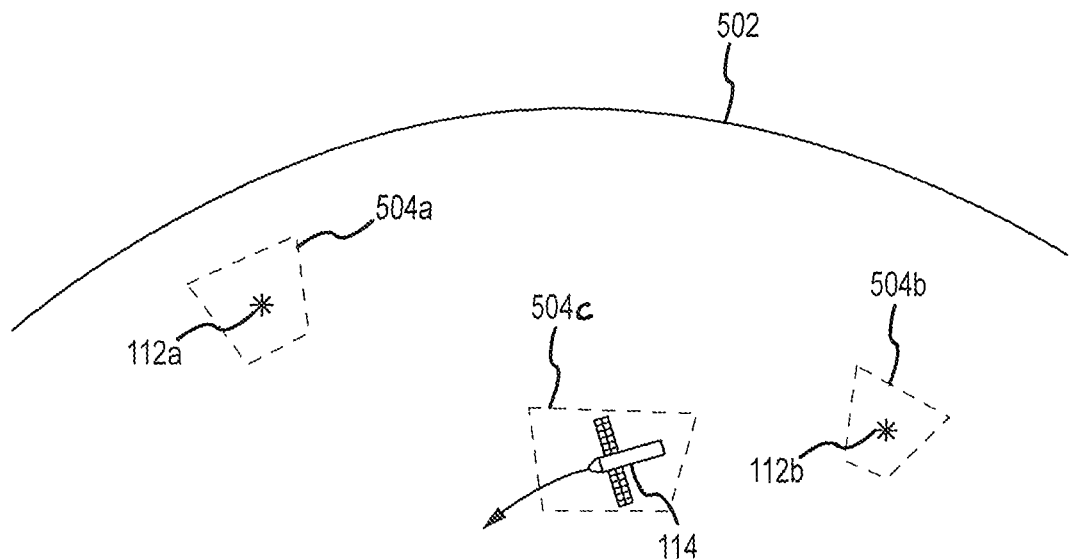
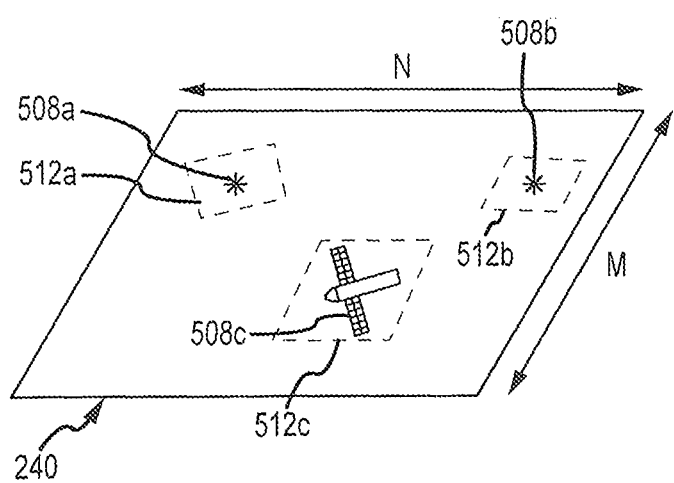
FIG.5

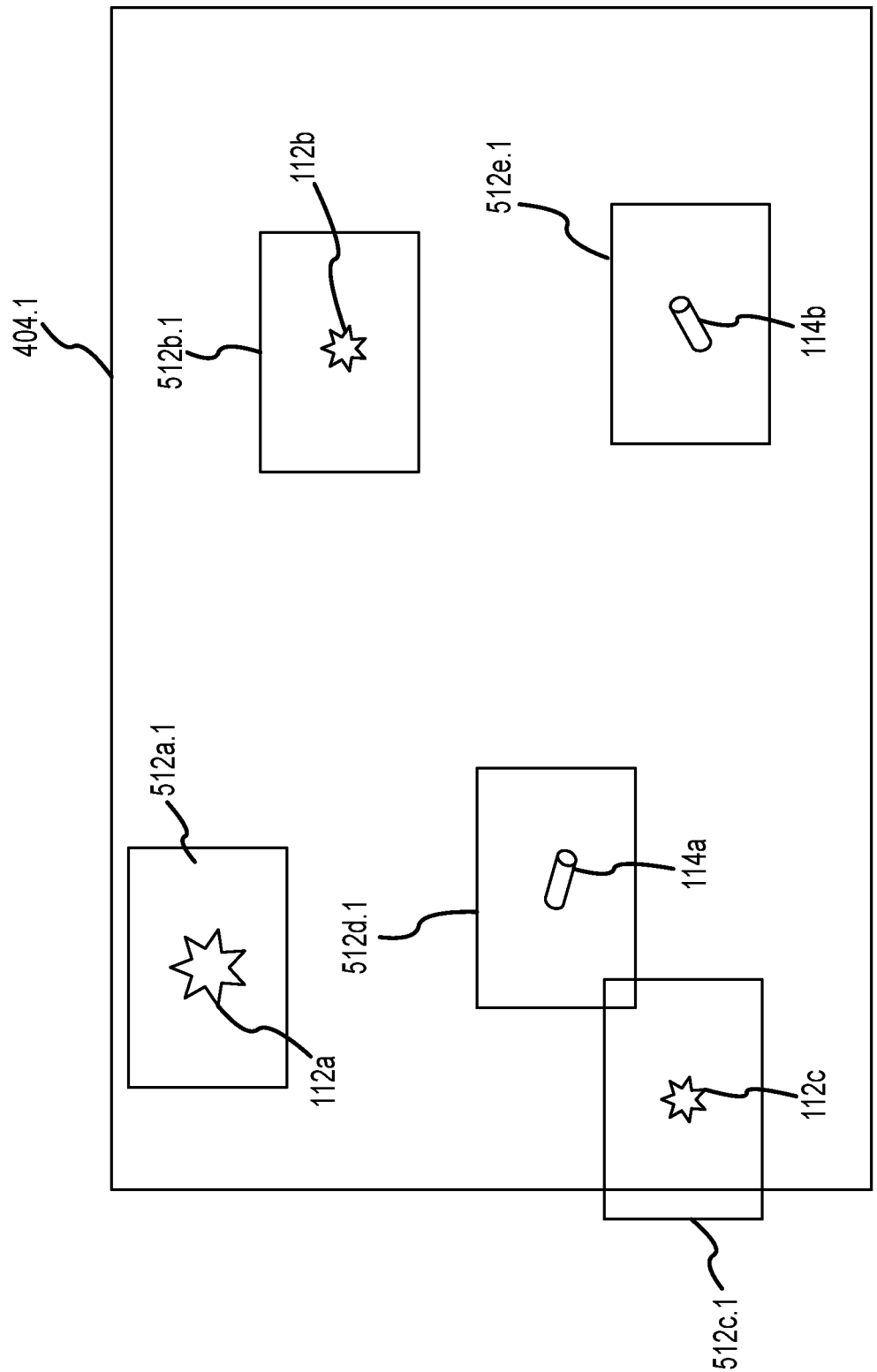

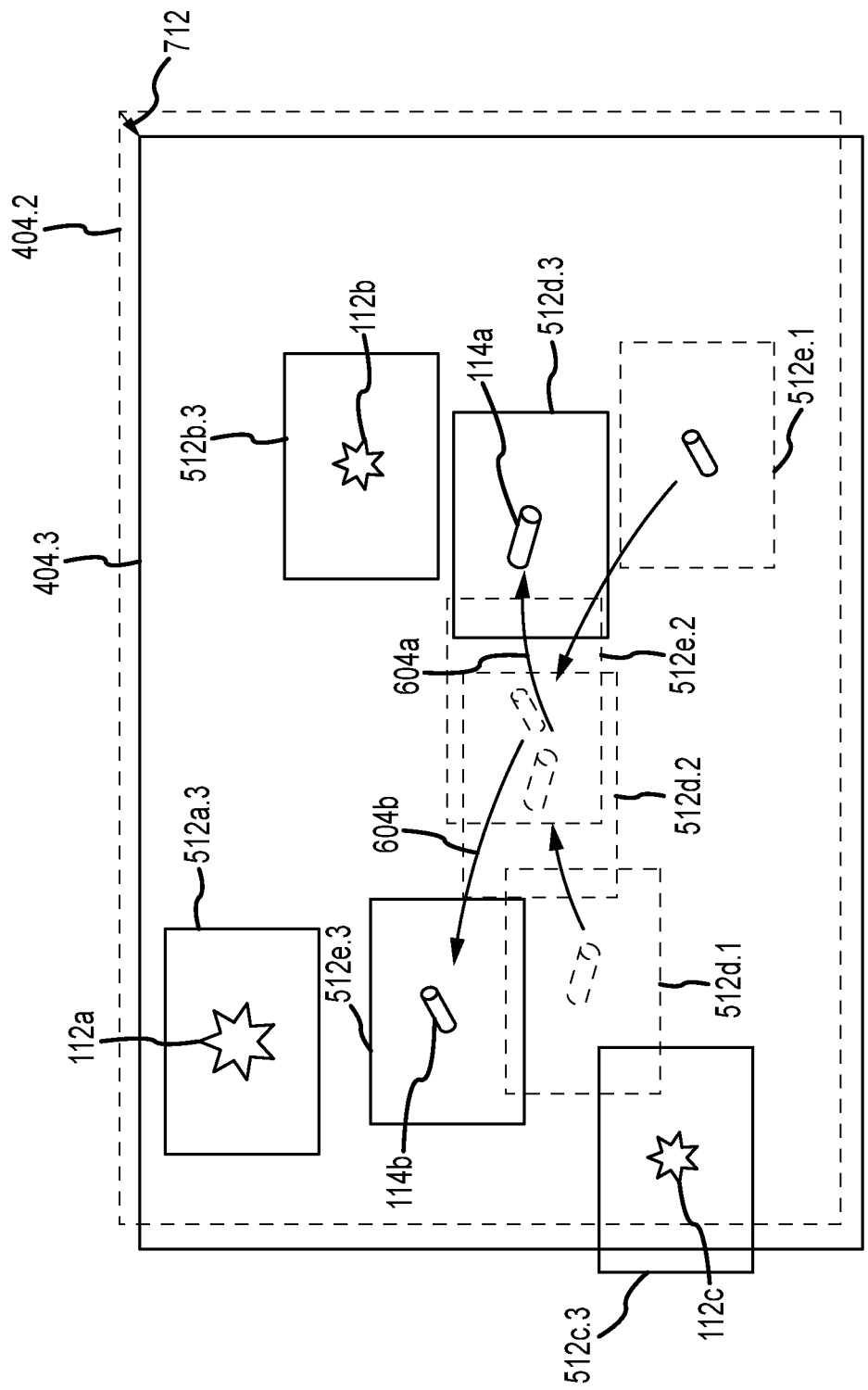

SYSTEMS AND METHODS FOR THE EFFICIENT DETECTION AND TRACKING OF OBJECTS FROM A MOVING PLATFORM

CROSS-REFERENCE TO RELATED APPLICATIONS

This application claims the benefit of U.S. Provisional Patent Application Ser. No. 62/892,867, filed Aug. 28, 2019, the entire disclosure of which is hereby incorporated herein by reference.

FIELD

Devices and methods for optically detecting and tracking inertially fixed objects and moving objects are provided.

BACKGROUND

Global positioning systems (GPS) are widely used for navigation including for ships, aircrafts, and missiles. However, these systems are vulnerable to interference and have other shortcomings. Their space components are subject to hostile attack and the systems may be jammed (i.e., GPS denied). The systems also suffer from reliability failures and these GPS systems do not provide the data needed for attitude determination. For centuries navigators have used the sky, particularly at night, for the most fundamental and accurate inertial system available, in which each star is a benchmark. Cataloged positions and motions of the stars define the celestial reference frame. The problem is stars are hard to see during the day. Therefore, there remains a need for a reliable and accurate backup to GPS systems.

Today, star tracker devices play a key role in guidance and control systems. In particular, effective methods for day and night tracking of both stars and resident space objects (e.g., satellites) is a key enabler for navigation in GPS-denied environments. A star tracker is fundamentally a camera that images a star field and computes and reports the direction toward each star. From these data, the tracker (or its host) can determine its attitude. Like all components used in space missions or on airborne vehicles, there is continuous pressure to reduce size, weight, power and cost (SWAP-C) and increase the lifetime of these components without compromising performance. A tracker must be rugged enough to survive the stresses of launch or deployment and then function for many years in the extreme temperatures and radiation encountered in harsh environments. Star trackers are typically mounted on the external surface of a spacecraft or vehicle bus and are not shielded from the environment.

In a typical implementation of a star tracker incorporating a digital image sensor, the sensor includes an array of pixels that is used to obtain an image from within a field of view of the device defined by the size of the sensor and associated imaging optics. Within the image, the relative location of tracked satellite to identified stars within the image, and the line of sight of the device, enable a relative location of the platform carrying the star tracker device to be determined. However, even with state-of-the-art digital image sensors, detecting dim objects remains a challenge, particularly during the daytime. In addition, the accurate registration of objects in view is a challenge, particularly in those cases in which the optical image sensor is moving. Similar problems with tracking and registration are present where one or more of the imaged objects is moving relative to the image sensor. In addition to star trackers, image sensors in the form of cameras used to obtain images of various scenes can benefit from an improved signal-to-noise ratio in order to detected dim or poorly illuminated objects. However, as with star trackers, the accurate registration of objects within a field of view is a challenge.

SUMMARY

Embodiments of the present disclosure provide systems and methods for day and night detection and tracking of stationary and moving objects in digital video streams. Moreover, embodiments of the present disclosure enable, in a highly effective and efficient computation manner via a camera that may itself be moving, the detection and tracking of objects. This includes day and night tracking of targets, including but not limited to stars and resident space objects (RSOs, e.g., satellites), for navigation in GPS-denied environments, as well as the more general case of terrestrial objects (e.g., tanks), seaborne objects (e.g., surface ships and submarines), and other airborne objects. An optical image sensor in accordance with embodiments of the present disclosure functions to detect objects, including dim objects, within an image area. The optical image sensor operates by taking multiple frames (images) of a scene. A processor included in or associated with the optical image sensor aggregates the images, until objects are detected within the scene. Each detected object is separately tracked by processing pixel-data near the image location of the detection. In particular, instead of treating each image of the video stream as monolithic and registering it to a previous image in the stream (i.e. estimating and compensating for image-to-image motion), an optical image sensor in accordance with embodiments of the present disclosure separates each image of the video stream into spatially separate and distinct sub-images, also referred to herein as registration frames or subframes, and registers the subframes with respect to the movement of the object of interest within that subframe stream. These subframe streams can then be coherently averaged independently, improving the detectability and tracking of all objects within the video stream, and without the compromise required if the image stream was registered as a single stream.

Embodiments of the present disclosure are directed to an image processing system, referred to herein as an image sensor system. The image sensor system can be used to detect and to track point-sources that move, one relative to another, differently across a field of view. The system includes a camera and associated read-out electronics that produce a time-tagged sequence of digital images. The image sensor system processes the images, each of short enough exposure so that streaking due to apparent motion of each tracked object is not much greater than the width of the point-spread function of the image sensor. The brevity of the exposure can result in a signal associated with a tracked object being undetectable above the noise in a single image. In accordance with embodiments of the present disclosure, the image sensor system can detect faint objects that move differently by combining the same sequence of images differently for each object. In accordance with further embodiments of the present disclosure, sub-areas or subframes of the full frame images are established for each tracked object, and sequences of the subframes are combined for detection and tracking of the associated object.

The apparent motion of a tracked object across the field of view is due in part to the rotation of the camera itself and in part to the rotation of the object about the camera. The image sensor system includes a gyroscope in order to account for the rotation of the camera itself. The image sensor system also includes a command-interface for ingesting both a list of inertially fixed objects to track and a list of non-inertial objects to track; each of the latter requires an estimate of its expected rotation about the camera. The system provides a refined measurement of the apparent relative angular motions of the tracked objects.

In accordance with embodiments of the present disclosure, the image sensor system can be operated to provide GPS-like geolocation by having the image-processing system simultaneously track stars and artificial satellites. The position of the image sensor system near Earth can then be calculated from the tracking data. The image sensor system can also be applicable to metrology, whether in the Earth's atmosphere or in outer space, and can be adapted to the tracking of reference-fiducials other than stars.

The design of the system supports daytime and nighttime operation within the Earth's atmosphere. Short exposure times during the day not only limit streaking due to angular motion but also limit saturation of the detector from the bright sky.

In accordance with embodiments of the present disclosure, the objects identified by the optical image sensor include inertially stationary objects (e.g. stars) and moving objects (e.g. resident space objects (RSOs), terrestrial objects (e.g., tanks), seaborne objects (e.g., submarines), and airborne objects). An optical image sensor in accordance with at least some embodiment of the present disclosure can implement a star tracker. By identifying, tracking, and determining a relative angle to stationary or moving objects having known absolute locations, attitude and location information can be derived by the star tracker, which can, for example, enable navigation in GPS denied environments. Alternatively or in addition, an optical image sensor in accordance with further embodiments of the present disclosure can implement a surveillance camera that is operated to identify and track one or more stationary or moving objects within a scene where the objects being identified or tracked do not have known absolute locations.

Additional features and advantages of embodiments of the present disclosure will become more readily apparent from the following description, particularly when considered together with the accompanying drawings.

BRIEF DESCRIPTION OF THE DRAWINGS

FIG. 5 depicts the imaging of objects within the celestial sphere onto a planar detector array;

FIG. 7A depicts a first plurality of subframes within a complete image frame in accordance with embodiments of the present disclosure at a first time;

FIG. 7C depicts the first plurality of subframes within a complete image frame in accordance with embodiments of the present disclosure at a third time;

DETAILED DESCRIPTION

Figure 1:
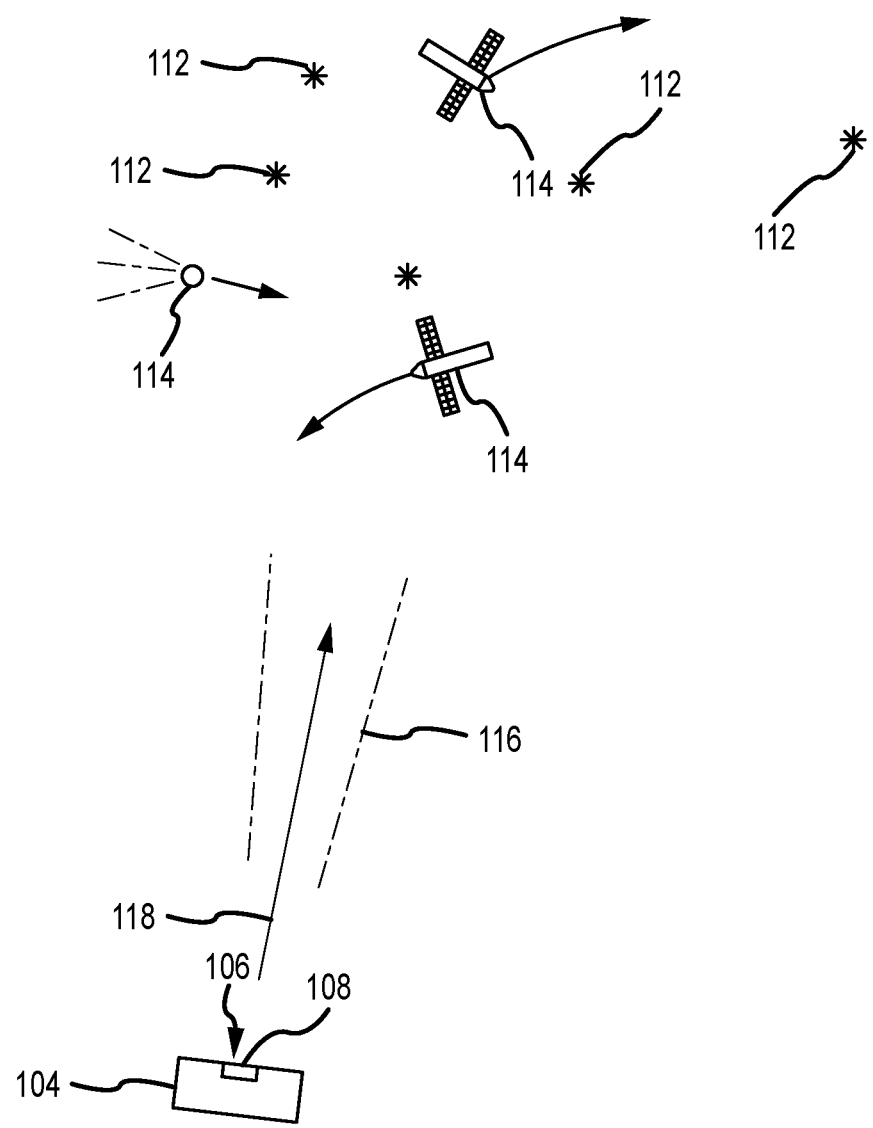
FIG. 1 depicts an optical image sensor system in accordance with embodiments of the present disclosure and a number of objects within a field of view of the image sensor system.

FIG. 1 depicts a platform 104 carrying an optical image sensor system 106, in accordance with embodiments of the present disclosure. As an example, the image sensor system 106 may be configured as a star tracker 108 used in connection with determining an attitude and position of the sensor system 106 and the associated platform 104. In other embodiments, the sensor system 106 may be configured as a surveillance camera, for example for use in connection with space situational awareness (SSO) operations. As used herein, a platform 104 can include, but is not limited to, a satellite, a manned spacecraft, an interplanetary spacecraft, an interstellar spacecraft, an orbiter, a lander, a missile, an aircraft, an unmanned aerial vehicle, a balloon, a stratospheric balloon, a terrestrial vehicle, a ship or any other platform or device to which an optical image sensor system 106 can be mounted or associated.

The optical image sensor system 106 images a plurality of stationary objects 112, such as stars, and moving objects 114, such as satellites or other resident space objects (RSOs), within a field of view 116 of the image sensor system 106. The field of view 116 is associated with a line of sight or boresight 118. Although depicted with a single field of view 116, an image sensor system 106 can have multiple fields of view 116. Alternatively or in addition, a platform 104 can be associated with multiple image sensor systems 106 having the same or different fields of view 116. As described herein, the image sensor system 106 enables attitude and geolocation determinations with associated time tags, and with registration of pixels within a frame relative to an inertial reference frame (IRF), such as but not limited to an Earth centered inertial (ECI) coordinate frame. Moreover, in accordance with embodiments of the present disclosure, the motion of the image sensor system 106 is sensed to enable stacking of multiple image frames collected by the image sensor system 106 in order to significantly boost the signal-to-noise ratio (SNR) of the object image, allowing the detection of objects 112 and 114, including in daylight or other noisy conditions.

Figure 2:
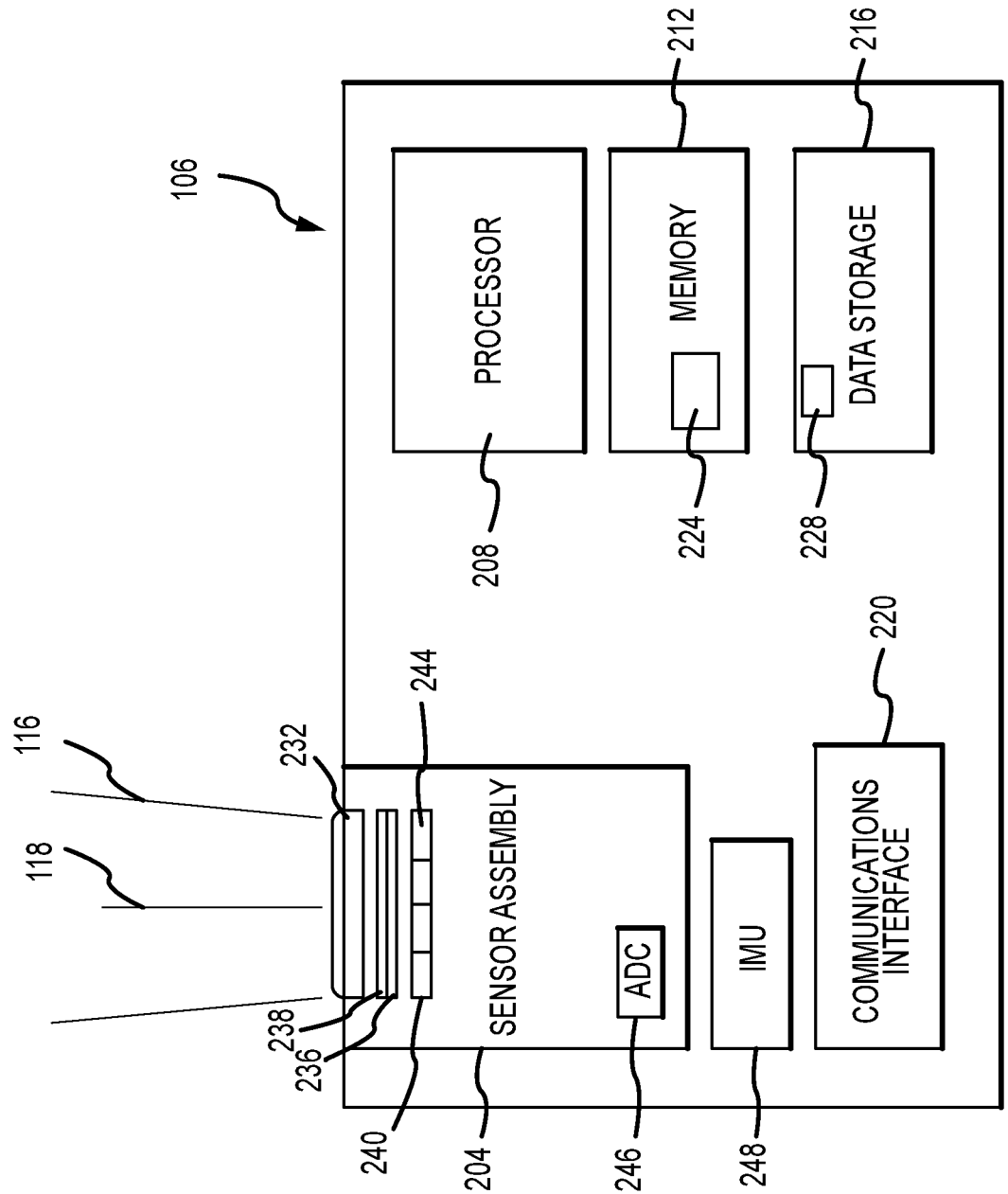
FIG. 2 depicts components of an optical image sensor system in accordance with embodiments of the present disclosure.

FIG. 2 depicts components of an optical image sensor system 106 in accordance with embodiments of the present disclosure. In general, the optical image sensor system 106 includes a sensor assembly or camera 204, a processor 208, memory 212, data storage 216, and a communications interface 220. The sensor assembly 204 generally includes a lens assembly 232, a shutter 236, an aperture 238, and a detector or sensor 240 containing a plurality of photosensitive sites or pixels 244 arranged in a planar array of n rows and m columns. As an example, but without limitation, the detector 240 can include a backside illuminated CMOS image sensor having a 1024×1024 array of pixels 244. As another example, the detector 240 may be in the form of an image sensor having a 640×512 array of pixels 244. An optical image sensor system 106 in accordance with embodiments of the present disclosure also includes inertial measurement unit (IMU) 248. As an example, the IMU 248 can be in the form of a fiber optic gyroscope that senses motion of the optical image sensor system 106. The various components of the sensor assembly 204 can be interconnected by or disposed within a housing.

The lens assembly 232 is oriented along the boresight 118, and collects light from within the field of view 116. The collected light is selectively passed to the array of pixels 244 by the shutter 236, which can be operated to define the exposure time. In particular, the sensor assembly 204 can be operated such that the exposure times are sufficiently short to avoid the smearing of point light sources across the image sensor pixels 244. The amount of collected light passed to the detector 240 during an exposure period can also be controlled by varying the size of the aperture 238. The sensor assembly 204 can include or can be associated with driver and analog to digital conversion (ADC) circuitry 246, enabling the sensor assembly 204 to provide a digital output representative of an amplitude or intensity of light detected at each pixel 244 within the detector 240.

The optical image sensor system 106 processor 208 can include one or more general purpose programmable processors, graphics processing units (GPUs), vector processors, array processors, field programmable gate arrays (FPGA), controllers, or other processing device or set of devices capable of executing instructions for operation of the optical image sensor system 106, including operation and control of the sensor assembly 204 and the registration and aggregation of subframe images as described herein. The instructions executed by the processor 208 can be stored as application programming 224 in the memory 212 and/or data storage 216. The memory 212 can include one or more volatile or nonvolatile solid-state memory devices, such as but not limited to RAM, SDRAM, or the like. The data storage 216 can include one or more mass storage devices, such as, but not limited to, a hard disk drive, an optical storage device, a solid-state drive, or the like. In addition to providing storage for the application programming 224, the memory 212 and/or the data storage 216 can store intermediate or final data products or other data or reference information 228. In the case of a star tracker 108 embodiment, the memory 212 and/or the data storage 216 of the optical image sensor system 106 can store reference information 228 in the form of an object catalog database, navigational information, a star database or catalog, RSO ephemeris data, and image data. In addition, the memory 212, data storage 216, and/or memory or data storage included in the sensor assembly 204 can store detector performance parameter data.

Figure 3:
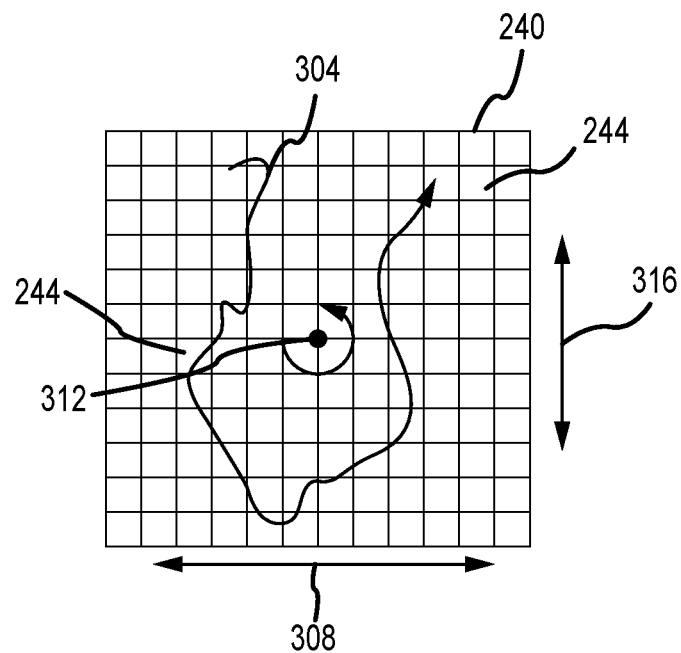
FIG. 3 depicts an example motion trajectory of a focal plane during a period of time.
Figure 4:
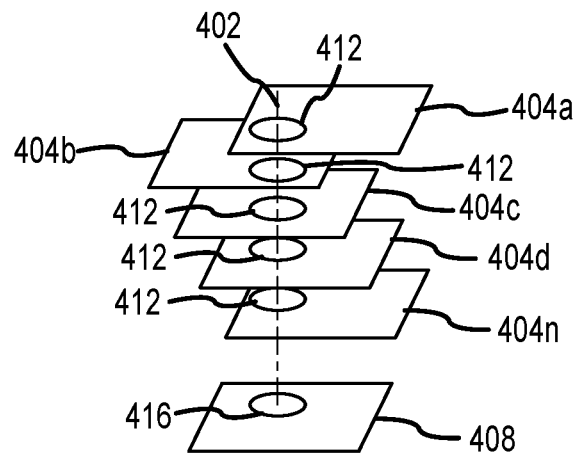
FIG. 4 depicts a single object image registration and aggregation process in accordance with embodiments of the present disclosure.

As can be appreciated by one of skill in the art after consideration of the present disclosure, smearing of a collected image can be minimized or avoided by using a sufficiently short exposure time. However, a short exposure time can result in an inability to distinguish an object 112, 114 from noise within a given image frame. In order to increase the signal-to-noise ratio, multiple images can be taken and summed or aggregated. However, the collection of multiple frames of image data, even where the frame rate is relatively high, will be accompanied by some movement of the sensor assembly 204 relative to the Earth centered inertial (ECI) coordinate frame, which will in turn result in smearing within the aggregate image. An example motion trajectory 304 of the detector 240 during a period of time is depicted in FIG. 3. Pitch 308, yaw 312, and roll 316 axes are also shown. As a result of the motion of the sensor assembly 204 relative to the coordinate frame, the identity of a pixel 244 having a line of sight intersecting a particular object will change as the attitude of the camera 204 focal plane changes. Therefore, in order to ensure that the collected images, and in particular the signals collected by the individual pixels 244, are accurately registered, it is necessary to register the detector 240 pixels 244 relative to a common reference across the sequence of image frames 404. This concept is depicted in FIG. 4, which shows the alignment of the multiple image frames 404a-n about a common reference line 402 encompassed by the fields of view 116 of the image frames 404, in order for the information in the multiple frames 404 to be added accurately to form an aggregate image frame 408. More particularly, an object image 412 that appears only dimly in the individual image frames 404 appears more strongly as an aggregate object image 416 in the aggregate frame 408. Moreover, and as discussed in greater detail elsewhere herein, the object image 412 may be present below or just above a level of noise in the individual image frames 404, but through the registration of the image frames 404 and the aggregation of the data corresponding to the object image 412 included in those image frames 404, the aggregate object image 416 is presented in the aggregate image frame 408 at well above the noise levels. Accordingly, the identification and tracking of objects 112 and 114 even when high levels of noise are present, for example during operation of a star tracker 108 in daytime or operation of a sensor system 104 as a surveillance camera to image objects in poorly illuminated scenes, is possible.

With reference now to FIG. 5, and as can be appreciated by one of skill in the art after consideration of the present disclosure, the accurate determination of a position of an object 112, 114 relative to an imaging system 104 requires a translation between the Earth centered inertial reference frame, which locates the objects 112, 114 within the celestial sphere 502 and which typically uses angular coordinates to identify discrete locations, and the generally planar detector 240 array of pixels 244, which typically uses Cartesian coordinates to identify discrete locations. In accordance with embodiments of the present disclosure, this translation is performed using texture mapping techniques to ensure the accurate alignment of the aggregated frames or subframes. In accordance with further embodiments of the present disclosure, image stacking is accomplished by way of the image sensor's calibration, which maps pixel-coordinates to unit-vector components in the image sensor's mechanical attitude at the central time of exposure of each image. By thus co-adding the frames 404 of image data, the signals obtained from the same points in space can be accurately aligned, enabling enough signal to be accumulated to obtain an image of dim objects 112, 114.

As can be appreciated by one of skill in the art after consideration of the present disclosure, an image sensor system 106 implementing a star tracker 108 must track multiple stationary objects 112 in order to provide attitude or location information. In addition, an image sensor system 106 in accordance with embodiments of the present disclosure and implementing a star tracker 108 is capable of tracking multiple stationary objects 112 and multiple moving objects 114 simultaneously. This is at least in part enabled by establishing a plurality of registration frames 504. More particularly, one registration frame 504 can be established for each tracked object 112, 114 around or encompassing an area of the celestial sphere 502 at which the object 112, 114 is expected to be located. Each registration frame 504 within the reference frame 502 is mapped to a subframe 512 within the array of detector pixels 244 using texture mapping. As a result, an image 508 of each object 112, 114 is tracked within a corresponding subframe or subset 512 of pixels 244 of the detector 240. For example, a first object 112a located within an area of the Celestial sphere 502 corresponding to a first registration frame 504a appears as an imaged object 508a within a first subframe 512a; a second object 112b located within an area corresponding to a second registration frame 504b appears as an imaged object 508b within a second subframe 512b; and a third object 114 located within an area corresponding to a third registration frame 504c appears as an imaged object 508c within a third subframe 512c. As discussed in greater detail elsewhere herein, the establishment of an individual registration frame 504 for each tracked object 112, 114, and a corresponding subframe or area 512 on the detector 240, can result in a simplified processing procedure or algorithm. In addition, and as also discussed in greater detail elsewhere herein, this enables or facilitates the establishment of multiple parallel processes, with one process established for each tracked object 112, 114. Moreover, the establishment of individual registration frames 504 for each tracked object 112, 114 can facilitate the tracking of objects 112, 114 moving at different rates relative to the image sensor system 104.

Figure 6:
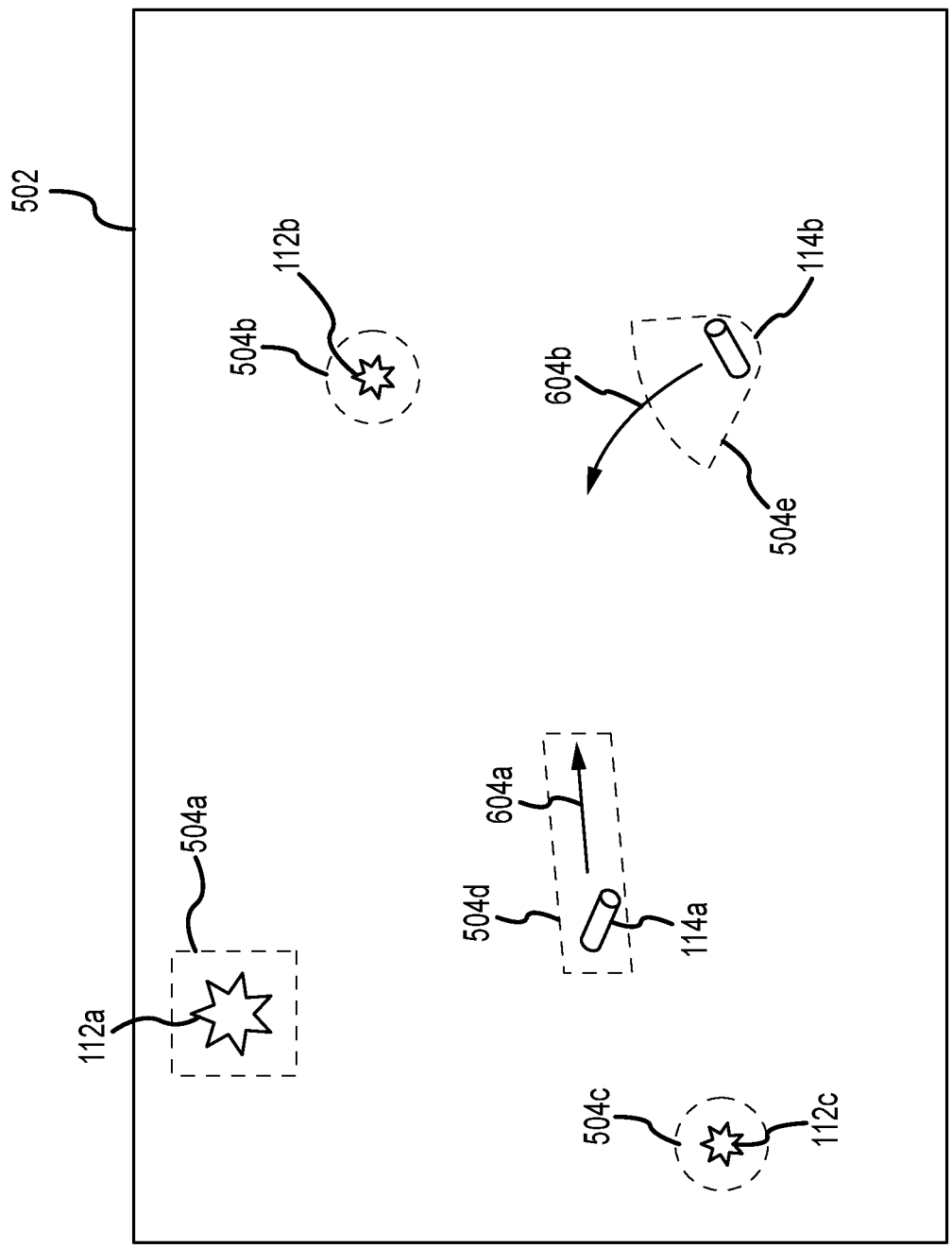
FIG. 6 depicts an example image frame captured by an image sensor system in accordance with embodiments of the present disclosure.

For example, and as depicted in FIG. 6, a number of objects 112, 114 may be present within the field of view 116 of the image sensor system 106, arrayed against the celestial sphere 502. In particular, in this example, a first star 112a, a second star 112b, a third star 112c, a first RSO 114a, and a second RSO 114b are within the field of view 116. While the stars 112 are fixed relative to an IRF, the RSOs 114 are associated with trajectories 604 along which those objects 114 move relative to the IRF. The locations of the stars 112 are known and can be stored as star catalog data 228 in the data storage 216 of the image sensor system 106. The trajectories 604 along which the moving objects 114 travel are approximately known and can be stored as ephemerides data 228 in the data storage 216 of the image sensor system 106. Accordingly, using the star catalog and ephemerides data for objects 112, 114 to be tracked, areas, referred to herein as registration frames 504, in which each object 112, 114 is expected to be found, can be established. The approximate locations can be determined from, for example, attitude and location information obtained from the IMU 248 of the star tracker sensor assembly 204, with reference to a star catalog or RSO ephemeris data stored as part of the star tracker data 228. The shapes of the registration frames 504 can be the same or varied from one another. As examples, but without limitation, the registration frames 504 can be square, rectangular, circular, triangular, or the like. Moreover, different shapes can be selected for different objects 112, 114 or different object characteristics. For instance, a shape that is elongated along an expected path or trajectory 604 can be selected for a moving object 114. As another example, a size of a registration frame 504 can be larger for moving objects 114 than for stationary objects 112, and can be larger for moving objects 114 having relatively faster velocities relative to the array of pixels 244 than relatively slower moving objects 114. As still another example, a size of all of the registration frames 504 can be increased when movement of the platform 104 is or is expected to be high.

Figure 7B:
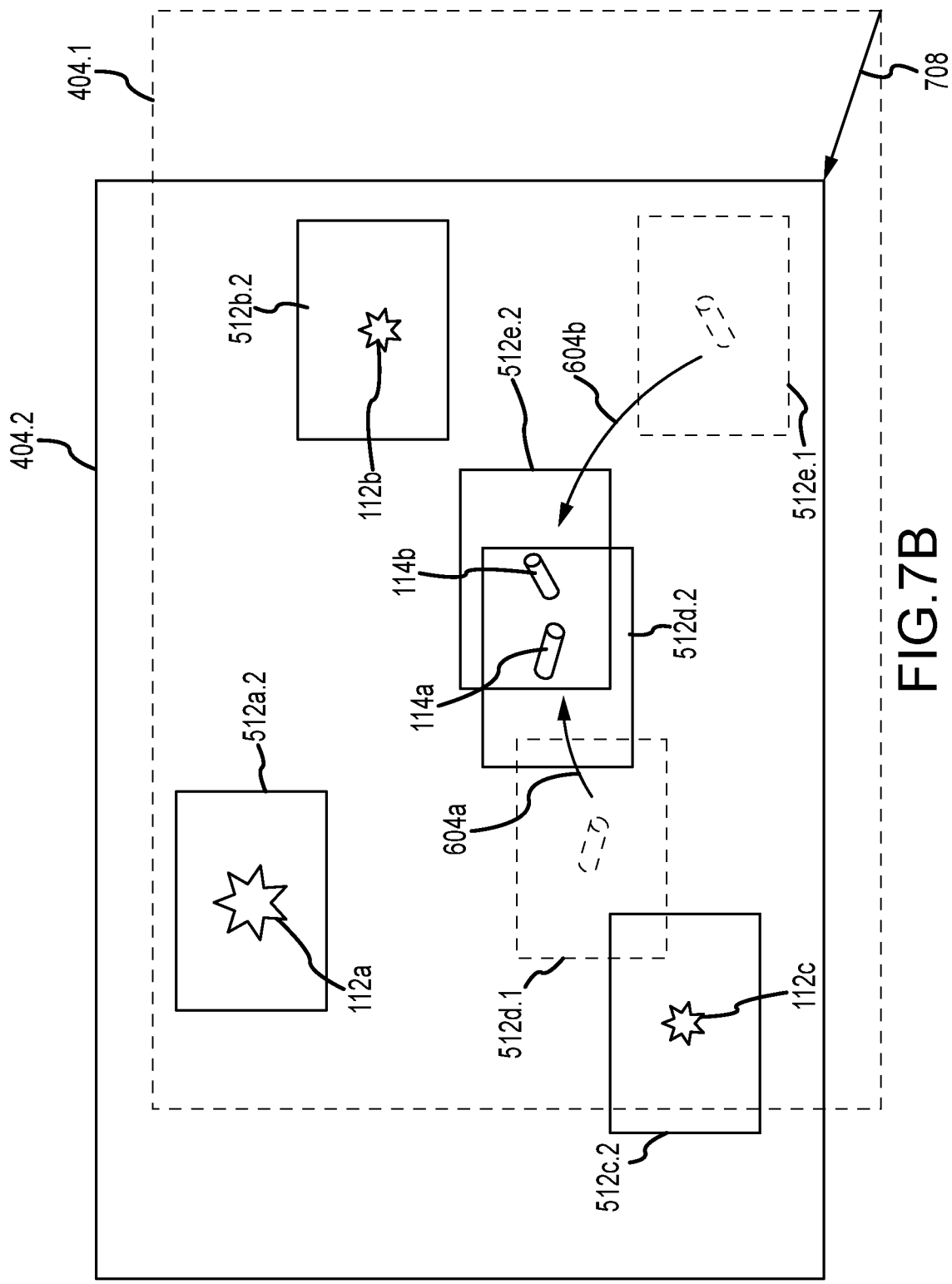
FIG. 7B depicts the first plurality of subframes within a complete image frame in accordance with embodiments of the present disclosure at a second time.

As previously noted, the registration frames 504 within the reference frame in which the locations of the objects 112, 114 are mapped or catalogued can be mapped to corresponding subframe 512 areas on the detector 240. Accordingly, and as depicted in FIG. 7A, a subframe 512 within or at least partially encompassed by an image frame 404.1 captured by the detector 240 is established for each object 112 or 114 identified or tracked by the star tracker 108. In particular, a first subframe 512a.1 is established for the first stationary object 112a, a second subframe 512b.1 is established for the second stationary object 112b, a third subframe 512c.1 is established for the third stationary object 112c, a fourth subframe 512d.1 is established for the first moving object 114a, and a fifth subframe 512e.1 is established for the second moving object 114b. As can be appreciated by one of skill in the art after consideration of the present disclosure, the mapping of a registration frame 504 from an Earth centered inertial reference frame to an area or subframe 512 established in terms of pixel 244 coordinates on a detector 240 can result in different perimeter characteristics. Moreover, the mapping can result in subframe 512 areas having borders that cross portions of one or more pixels 244. However, this does not adversely affect the output of the image sensor system 106. Although the identity and arrangement of objects 112, 114 in FIG. 7A are the same as those depicted in FIG. 6, the size and shapes of the subframes 512 are depicted in FIG. 7A (and also in related FIGS. 7B-7C) as simple rectangles, rather than attempting to accurately depict a translation of the variety of shapes of the registration frames 504 depicted in FIG. 6, in order to simplify the figures.

The locations of the subframes 512 corresponding to the registration frames 504 at least approximately correspond to and encompass the expected locations of objects 112 and 114 catalogued within the star tracker data 228. As previously noted, the approximate locations can be determined from, for example, attitude and location information obtained from the IMU 312 of the star tracker sensor assembly 204, with reference to a star catalog or RSO ephemeris data stored as part of the star tracker data 228. A subframe 512 may have an area that covers the same or a different number of pixels as any other subframe 512. Moreover, a subframe 512 may be approximately centered around an object 112 or 114 being tracked within that subframe 504. Furthermore, less than the entire area of a subframe 512 may be included within any one image frame 404.1, for example as depicted by subframe 504c.1, tracking stationary object 112c. Moreover, different subframes 512 may have different shapes and/or dimensions.

FIG. 7B depicts an image frame 404.2 including images of the same set of identified objects 112 and 114 as in FIG. 7A, but where the image information is collected at a second point in time, after the point in time at which the image frame 404.1 illustrated in FIG. 7A is depicted. As can be appreciated by one of skill in the art after consideration of the present disclosure, and in particular where the image sensor system 106 is mounted to a moving platform 104, the locations of the stationary objects 112 within the field of view 116 of the star tracker 108 will change due to movement of the star tracker 108. This movement is depicted in the figure as a shift 708 in the location of the border of the first image frame 404.1 taken at the first time relative to the location of the image frame 404.2 taken at the second time. Although the pixels within the second image frame 404.2 on which the objects 112 and 114 are centered are different than in the first image frame 404.1, the subframes 512a.1 to 512c.1 remain centered on their respective objects 112 and 114, although drift from moving objects 114 can be expected where there are errors in the ephemeris for such objects 114. However, where the drift from the expected location is slow enough, the object 114 will remain detectable and trackable. In addition, errors in the ephemeris data can potentially be removed by feedback derived from the actual tracking data. In accordance with embodiments of the present disclosure, centering can be maintained by applying the IMU 248 data to adjust the locations of the subframes 512 relative to the detector 240 pixels 244. In addition, the locations of the moving objects 114 within the field of view 116 will change due to the movement of the star tracker 108 and due to the motion of the moving objects 114a and 114b along their respective trajectories 604a and 604b. As depicted in FIG. 7B, although the locations of the moving objects 114a and 114b within the image frame 404 have changed, and even though the moving objects 114a and 114b are also moving relative to the optical sensor boresight 118 due to their motion across the celestial sphere, the subframes 512d.2 and 512e.2 associated with the moving objects 114a and 114b respectively remain centered on those objects 114a and 114b. However, as a result of movement of the star tracker 108 and the movement of objects 114 between the first and second times, the set of pixels encompassed by each subframe 512d.2 and 512e.2 will change from the first time to the second time. This centering can be maintained by applying the IMU 248 data as for stationary objects, and in addition by applying ephemeris data for each of the moving objects 114.

FIG. 7C illustrates a third image frame 404.3 that includes the same identified objects 112 and 114 as in image frames 404.1 and 404.2, but taken at a third point in time. As shown, the locations of the stationary objects 112 have shifted due to movement of the optical sensor boresight 118, shown as a shift 712 in the location of the border of the image frame 404.2 taken at the second time relative to the location of the image frame 404.3 taken at the third time. The subframes 512a.3 to 512e.3 remain centered around their respective objects 112 and 114 at the third time. Accordingly, even though the orientation of the boresight 118 of the image sensor 108 is changing and even though objects 114a and 114b are moving, the subframes 512 remain centered on their respective objects 112, 114.

Figure 7D:
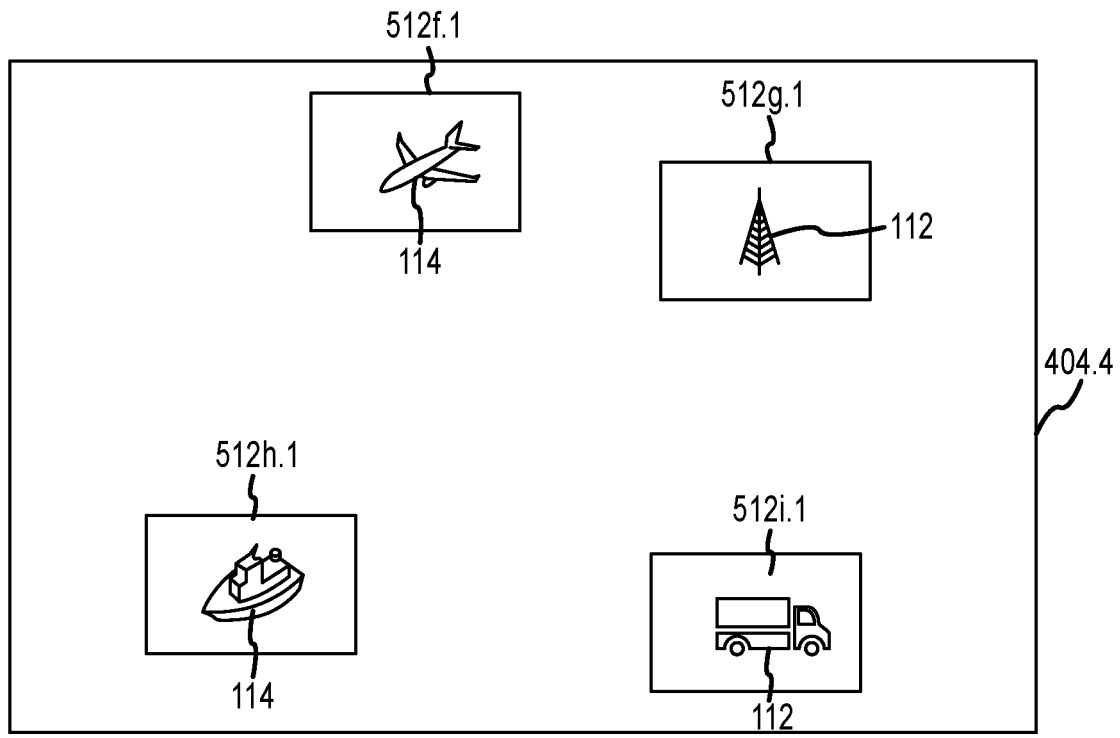
FIG. 7D depicts a second plurality of subframes within a complete image frame in accordance with embodiments of the present disclosure at a first time.

FIG. 7D illustrates an example of an image frame 404.4 taken by an optical image sensor system 106 in the form of a surveillance camera. In the example scene encompassed by the image frame 404.4, a number of objects 112, 114 have been selected for tracking, and have thus been associated with registration frames and corresponding subframes 512f.1-512i.1. The objects 112, 114 can be selected through manual selection, from reference data, or identification by an instrument or sensor that is provided in addition to the surveillance camera itself. In accordance with still other embodiments of the present disclosure, one or more of the objects 112, 114 can be identified using an automated image recognition facility from an image taken by the surveillance camera 110, another instrument, or a combination of sources.

Figure 7E:
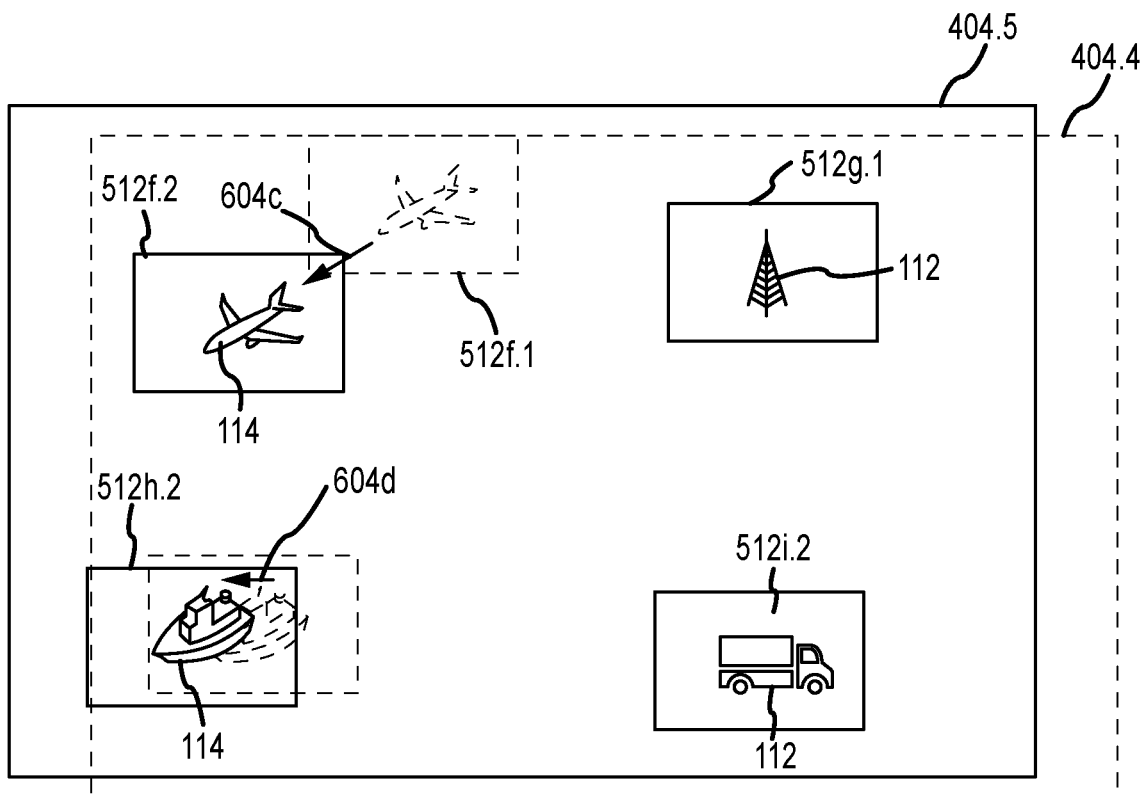
FIG. 7E depicts the second plurality of subframes within a complete image frame in accordance with embodiments of the present disclosure at a second time.

FIG. 7E depicts an image frame 404.5 encompassing the same objects 112, 114 as in frame 404.4, but taken at a later point in time. As depicted in FIG. 7D, the locations of the subframes 512f.2-512i.2 within the full image frame 404.4, and the image sensor pixels encompassed by the subframes 512f.2-512i.2, have changed as compared to the subframes 512f.1-512i.1 due to movement of the surveillance camera boresight 118. In addition, for moving objects 114, associated subframes 512 can move to track the respective objects 114 as they move along associated trajectories 604c and 604d. The tracking of moving objects 114 can be enabled or facilitated by reference data regarding the expected trajectory of an object 114 of the type being tracked. Notably, a stationary object 112 can become a moving object 114, and vice versa.

In accordance with embodiments of the present disclosure, the image data encompassing a selected object 112 or 114 within a series of subframes 512 for the respective object 112 or 114 acquired in connection with a number of image frames 404 taken at different times can be aggregated to enable the centroid of the object 112 or 114 to be accurately located, even in daylight or other noisy conditions. Moreover, by utilizing subframes 512, embodiments of the present disclosure enable the detection and identification of an object 112 or 114, and the detection of the centroid of that object 112 or 114, to be performed quickly and efficiently.

Figure 8:
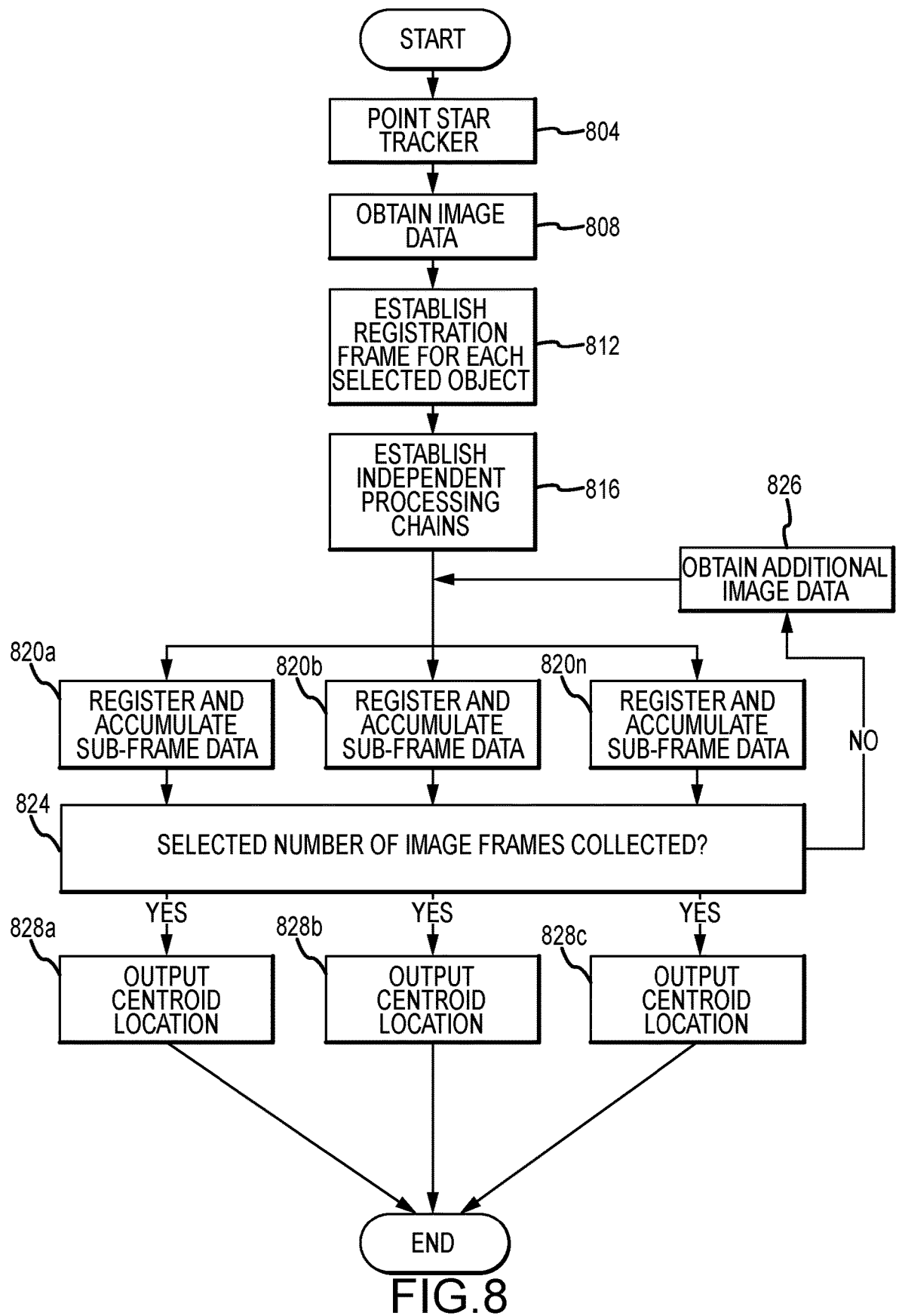
FIG. 8 depicts aspects of a process for registering and aggregating subframe images and for detecting and tracking objects in accordance with embodiments of the present disclosure.

FIG. 8 is a flowchart illustrating additional aspects of a process for detecting and tracking stationary 112 and moving objects 116 in accordance with embodiments of the present disclosure, and in particular depicts the establishment of multiple parallel processing chains for processing image data associated with individual objects 112, 114. Initially, at step 804, an optical image sensor system 106 field of view 116 is directed or pointed at an area of the celestial sphere 502 so as to encompass a selected set of objects 112 and/or 114. The selected set of objects 112, 114 can include a star field, where the approximate locations of stationary objects 112 such as stars within the reference frame of the celestial sphere are known, for instance from IMU 248 data, the orientation of the field of view 116, and a star map. Where the optical image sensor system 106 implements a surveillance camera, the objects 112 and/or 114 can be included in a scene from which surveillance information is to be obtained. In addition, the expected set of objects 112, 114 can include one or more moving objects 114 that will be traversing the field of view 116. The optical image sensor system 106 is then operated to obtain a frame of image data or image frame 404 (step 808).

At step 812, a registration frame 504 is established for each selected object 112, 114. Each registration frame 504 area encompasses the approximately known location of the selected objects 112, 114. At step 816, a processing chain is established for processing data associated with each of the registration frames 504. In each processing chain, an area or subframe 512 of pixels 244 on the detector 240 corresponding to an area encompassed by a respective registration frame 504 is registered and data within that subframe 512 is accumulated (steps 820a-n). A determination is then made as to whether a selected number of frames 404 have been collected (step 824). The selected number of frames can be a predetermined number, a number based on expected ambient light conditions, a number based on actual light conditions, or the like. If additional frames 404 are to be collected, the process returns to step 826, where an additional frame 404 of image data is acquired, and information from the image is provided to the individual processing chains. Once the selected number of images have been collected, a centroid location for the object 112, 114 tracked in each processing chain is provided as an output (step 828). The process can then end.

As discussed herein, the coherent summation or aggregation of images allows image features corresponding to objects 112, 114 to be distinguished from noise. In addition, by processing select areas or subframes 512 of a full image frame, processing resources can be concentrated on areas containing objects of interest, and furthermore enhances the ability to track a plurality of objects 112, 114, including objects that are themselves moving within the reference frame 502, accurately.

As can be appreciated by one of skill in the art, a digital image is an array of discrete and independent points, where each point or pixel of a detector represents a specific point in a scene or image and has an associated brightness. Taken together, the array of pixels 244 describes the entire scene, which may contain any number of objects 112, 114, such as stars or space objects. More particularly, each pixel or photosensitive site 244 responds to the amount of light it receives by producing an amount of charge, which is converted to a numeric value corresponding to the brightness of the corresponding point in the scene. However, an individual detector 240 may have performance characteristics that differ from other otherwise similar detectors, and individual pixels 244 within a detector 240 can have performance characteristics that differ from other pixels 244 within the detector 240. The performance characteristics of detector 240 pixels 244 can include whether a particular pixel provides reliable and useful data, which is expressed by a "good detector map"; a signal or noise level produced by a detector even when it is not exposed to light, which is expressed by a "pixel dark variance map", where variance describes the amount of noise produced by the pixel; and the maximum quantity of light that a pixel 244 can accurately measure, expressed by a "detector saturation map". These attributes can be measured and cataloged for each pixel 244 of a detector 240 prior to deployment of the detector 240 in an operational image sensor system 106. In addition, these attributes can be referenced in association with detector output provided as part of collected image frame data, to improve the quality of the image data related to an object 112, 114. Moreover, in accordance with embodiments of the present disclosure, these attributes can be processed across localized areas of the detector 240 corresponding to the subframes 512 established for imaging a number of tracked objects 112, 114 simultaneously, in a number of parallel processes.

Figure 9:
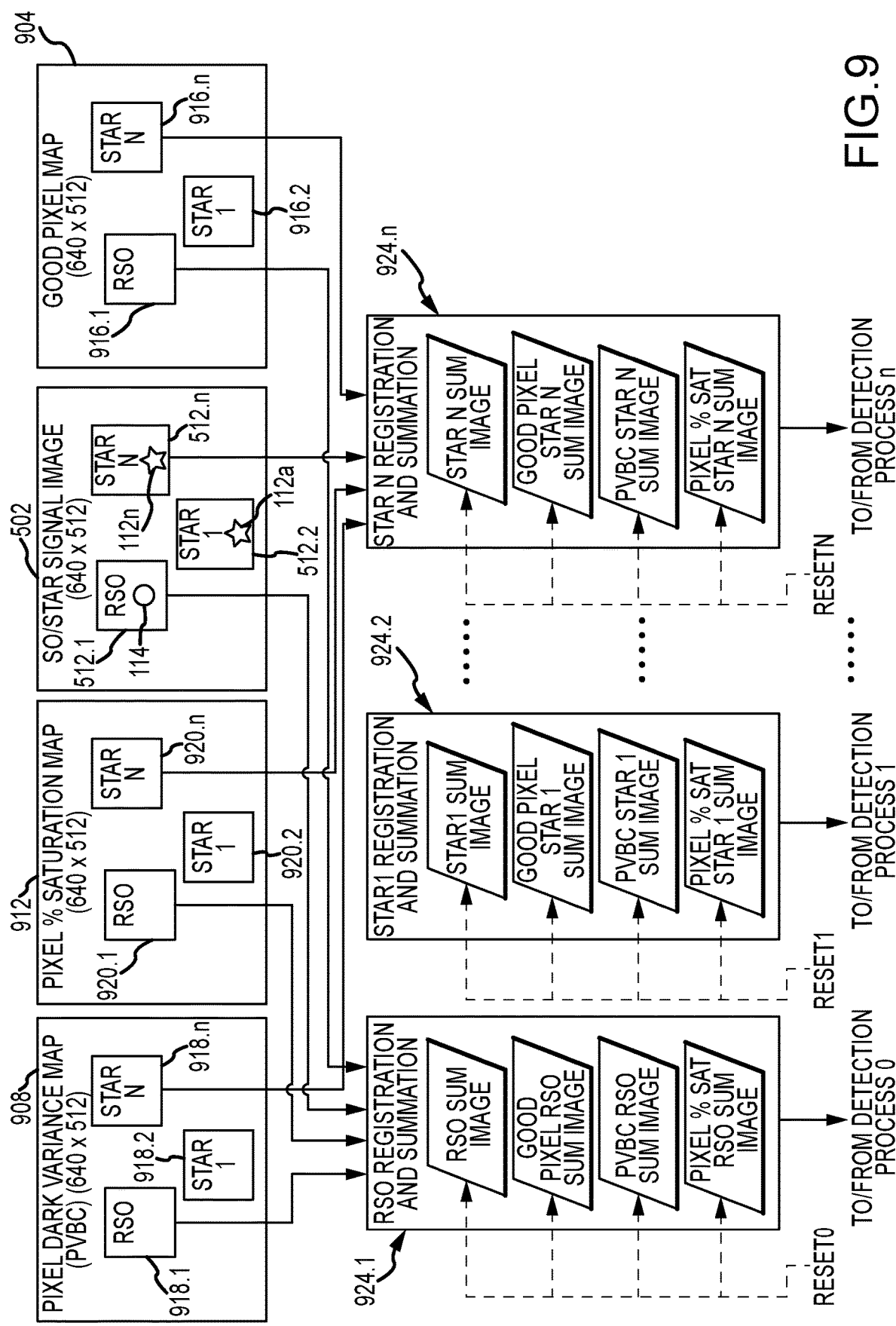
FIG. 9 is a flowchart depicting further aspects of a process for registering and aggregating subframe images and for detecting and tracking objects in accordance with embodiments of the present disclosure.

FIG. 9 depicts aspects of a process in accordance with embodiments of the present disclosure for tracking and detecting multiple objects 112, 114 that incorporates the parallel processing of subframe 512 image data related to the multiple objects 112, 114. The process includes the registration and coherent summation of subframe images 512, and the application of detector performance parameter data, which can include pre-computed good detector 904, pixel dark variance 908, and detector saturation maps 912, to collected image data.

Figure 10:
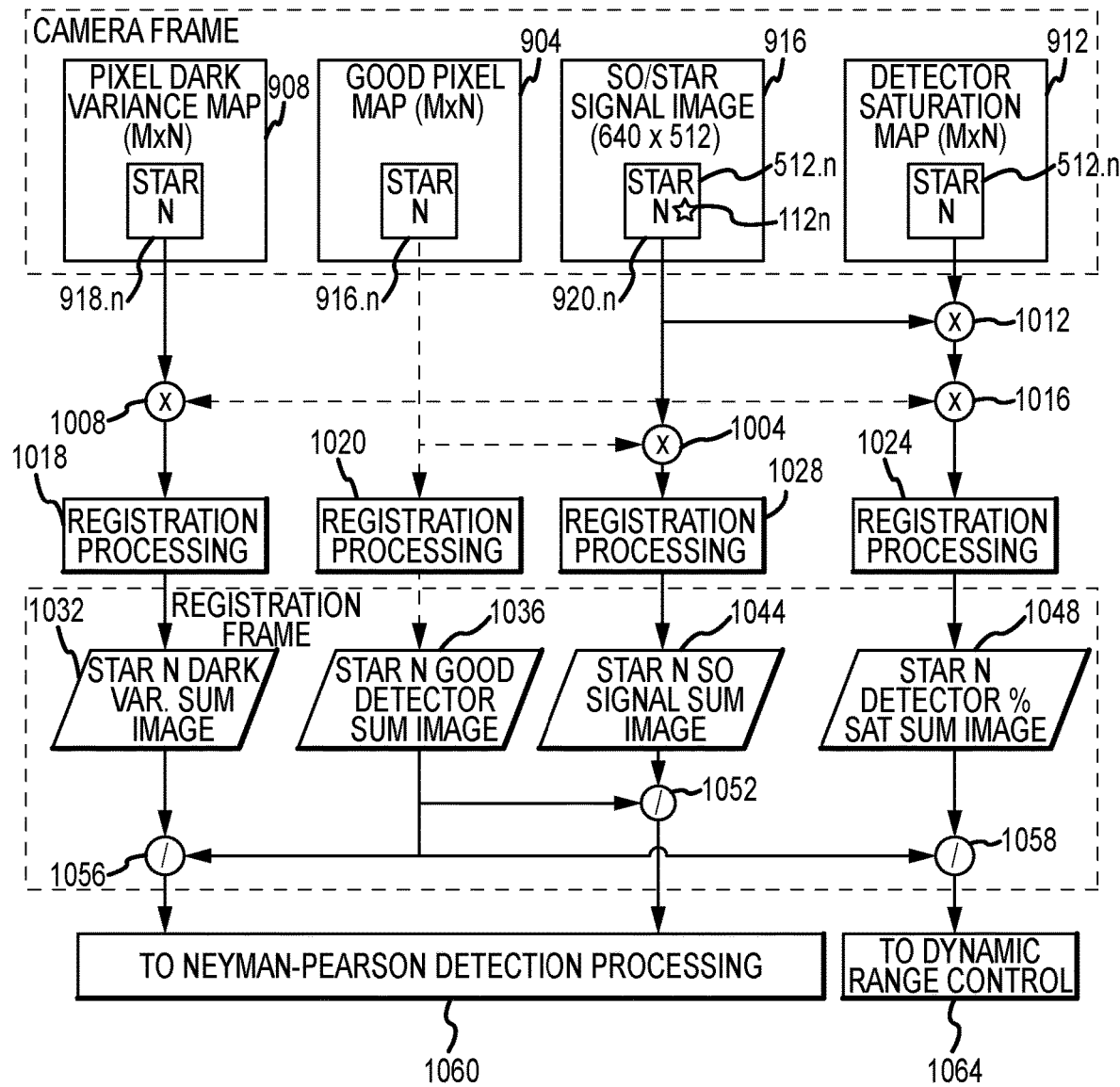
FIG. 10 depicts a process for combining image and pre-calculated data in accordance with embodiments of the present disclosure.

As previously discussed, registration frames 504 are established around the expected areas of objects 112, 114 selected for detection and tracking. These registration frames 504 are translated to subframes 512 encompassing corresponding areas of an image sensor system 106 detector 240. In accordance with embodiments of the present disclosure, sub-areas 916, 918, and 920 of the respective precomputed data maps 904, 908, and 912 that fall within the established subframe 512 areas of the detector 240 are provided as inputs to parallel data processing streams 924. Thus, for a first RSO 114, the subframe image data 512.1, good pixel map sub-area data 916.1, dark pixel variance map sub area data 918.1, and pixel saturation map sub-area data 920.1 are all provided to a first registration and summation process 924.1. Similarly, for a first object 112.1, good pixel map sub-area data 916.2, dark pixel variance map sub area data 918.2, and pixel saturation map sub-area data 920.2 are all provided to a second registration and summation process 924.2. In addition, for an nth object 112.n, good pixel map sub-area data 916.1n, dark pixel variance map sub area data 918.n, and pixel saturation map sub-area data 920.n are all provided to an nth registration and summation process 924.n. The sub-area 916, 918, and 920 data and the subframe 512 data associated with each object 112, 114 are then combined and summed for detection and tracking. As can be appreciated by one of skill in the art after consideration of the present disclosure, the processing of image and detector attributes for subframe areas can reduce the amount of data required to be processed, and can facilitate the tracking of objects 112, 114 moving relative to one another within larger frames 404 of data. With reference now to FIG. 10, aspects of a process, for example carried out as one of a plurality of parallel processing chains 924, for applying data from sub-areas of precomputed data maps 904, 908, and 912 to a subframe 512 of image data containing a single object 112, 114 are depicted. Although the illustrated example is with reference to a static object 112n, the same process can be applied to a moving object 114. In a first step 1004, the good detector sub-area data 916.n is applied to the image subframe 512.n through a multiplication step. In particular, the good detector map 904 data is in the form of a "1" for each good pixel 244, and a "0" for each bad pixel 244. Thus, the multiplication step 1004 removes values associated with bad pixels 244 from the image subframe 512.n. In addition, the number of summations can be determined from the number of "1s" accumulated for a location within the sub-area (step 1036), allowing the accumulated values appearing in the summed image to be normalized. Similarly, at step 1008 the values tabulated by the pixel dark variance map 908 can be removed from subsequent calculations by multiplying the relevant sub-area 918.n of the map 908 with the corresponding sub-area of the good detector map 904 data. At step 1012 a copy of the image data within the subframe 512.n is multiplied by a reciprocal (i.e. 1/s of the saturation value s) of the corresponding portion 920.n of the detector saturation map 912, to determine the amount of well fill, for example as a percentage that can be applied to a response curve for the pixels 244 within the subframe 512.n in connection with providing an accurate image output. In addition, the percentage values can be multiplied by the good detector map 904 data to remove bad pixels (step 1016).

At steps 1018, 1020, and 1024, the subarray data 916.n, 918.n and 920.n from the maps 904, 908, and 912 and at step 1028 the subframe data 512 from the image subframes 512 are registered. In accordance with embodiments of the present disclosure, the registration can be performed by applying data from the IMU 248. The registered sub-areas are summed at steps 1032, 1036, and 1048 respectively, and the registered subframes 512 are summed at step 1044. At step 1052, the summed image subframe 512 output from the image summation step 1044 is divided by the summed good detector subarea output from the good detector summation step 1036 (i.e. the number of pixel measurements contributing to the aggregate image), to provide a normalized image subframe output. This can be provided to a detection process 1060 and to further processes for detection and tracking operations. The output from the pixel dark variance summation step 1032 can also be normalized by dividing it by the output of the good detector summation step 1048 (step 1056), and the result can be provided for use by the detection process 1060 or other processes. In addition, the output from the detector saturation summation step 1048 can be divided by the output of the good detector summation step 1036 (step 1058), and the result can be provided to a dynamic range control process 1064, which can be used to adjust the gain of the detector 240, the exposure parameters, or the like. Different instances of this process can be performed simultaneously for other objects 112, 114 located within separate or overlapping subframes 512 established across the some or all of the same sequence of full frame images.

In accordance with embodiments of the present disclosure, the acquisition of image frames 404 and the processing of image data within subframes 512, including processing that includes the application of sub-areas of mapped detector 240 data can be performed simultaneously in parallel processing streams. Moreover, the different processing streams can use the same IMU 248 attitude and quaternion data. As can be appreciated by one of skill in the art after consideration of the present disclosure, embodiments of the present disclosure establish different sub-image or subframe 512 areas for each object 112 or 114 tracked by the optical image sensor system 106. Moreover, the subframe 512 areas track the different objects 112 and 114 separately and simultaneously. By using subframes 512 to track the different objects 112 and 114, tracking can be performed with greater accuracy and over a wider area within a field of view 116 of the optical image sensor system 106. In addition, tracking of one or more moving objects 114, even in daylight conditions, is possible.

In accordance with further aspects of the present disclosure, multiple stationary objects 112 can located in order to determine the attitude of the optical image sensor system 106. In addition, objects 114 moving along known paths can be located and tracked in order to geolocate the optical image sensor system 106. More particularly, geolocation information can be determined by determining a location of two or more moving objects 114 traversing a known path, or by determining a location of a single moving object 114 traversing a known path at two or more points in time.

Embodiments of the present disclosure enable images of dim objects 112, 114 to be obtained. More particularly, an optical image sensor system 106 with an improved SNR can be provided by stacking or aggregating multiple subframe images 512. In accordance with further embodiments of the present disclosure, a location at least some of the subframe images 512 relative to other subframe images acquired at the same time can be changed, in order to track moving objects 114. At least some embodiments of the present disclosure can be operated in conjunction with other instruments, for example in an initial step of determining an area encompassed by a subframe 512.

The foregoing discussion of the disclosed systems and methods has been presented for purposes of illustration and description. Further, the description is not intended to limit the disclosed systems and methods to the forms disclosed herein. Consequently, variations and modifications commensurate with the above teachings, within the skill or knowledge of the relevant art, are within the scope of the present disclosure. The embodiments described herein are further intended to explain the best mode presently known of practicing the disclosed systems and methods, and to enable others skilled in the art to utilize the disclosed systems and methods in such or in other embodiments and with various modifications required by the particular application or use. It is intended that the appended claims be construed to include alternative embodiments to the extent permitted by the prior art.

What is claimed is:

1. A method, comprising:
    determining a location of a first object within a reference frame;
    establishing a first registration frame having an area encompassing the first object;
    determining a location of a second object within the reference frame;
    establishing a second registration frame having an area encompassing the second object;
    mapping the first registration frame to a first subframe area of a first detector;
    mapping the second registration frame to a second subframe area of the first detector;
    acquiring a first set of images using the first detector while maintaining a location of the first object within the first subframe area of the first detector and while maintaining a location of the second object within the second subframe area of the first detector,
    wherein the first object has a location that is fixed within the reference frame,
    wherein the second object has a location that is moving within the reference frame, and
    wherein a location of the first subframe area relative to a location of the second subframe area in a first image of the first set of images is different than a location of the first subframe area relative to a location of the second subframe area in a second image of the first set of images;
    creating a first aggregate image using image data from within the first subframe area and acquired as part of at least some of the first set of images; and
    creating a second aggregate image using image data from within the second subframe area and acquired as part of at least some of the first set of images.

2. The method of claim 1, further comprising:
    receiving orientation information from a first inertial measurement unit, wherein a location of the first object within the first subframe area and a location of the second object within the second subframe area is maintained by reference to data provided from the first inertial measurement unit.

3. The method of claim 1, wherein a subset of pixels of the first detector included in the first subframe area at a time when the first image of the first set of images is acquired is different than a subset of pixels of the first detector included in the second subframe area at the time when the first image of the first set of images is acquired, and
    wherein a subset of pixels of the first detector included in the first subframe area at a time when the second image of the first set of images is acquired is different than a subset of pixels of the first detector included in the second subframe area at the time when the second image of the first set of images is acquired.

4. The method of claim 1, wherein the first object is a star, and wherein the location of the first object within the reference frame is determined from a star map.

5. The method of claim 4, wherein the second object is a resident space object, and wherein the location of the second object at a time of creating the first image of the first set of images is determined from a catalog of ephemeris data.

6. The method of claim 1, wherein the first aggregate image is created as an output of a first processing stream, and wherein the second aggregate image is created as an output of a second processing stream.

7. The method of claim 6, further comprising:
cataloging at least a first parameter of detector performance data for the first detector, wherein creation of the first aggregate image includes applying the cataloged first parameter of detector performance data for at least the first subframe area of the first detector in creating the first aggregate image, and wherein creation of the second aggregate image includes applying the cataloged first parameter of detector performance data for at least the second subframe area of the first detector in creating the second aggregate image.

8. The method of claim 6, further comprising:
cataloging a plurality of parameters of detector performance data for the first detector, wherein creation of the first aggregate image includes applying the cataloged plurality of parameters of cataloged detector performance data for at least the first subframe area of the first detector in creating the first aggregate image, and wherein creation of the second aggregate image includes applying the plurality of parameters of cataloged detector performance data for at least the second subframe area of the first detector in creating the second aggregate image.

9. The method of claim 8, wherein the plurality of parameters of detector performance data include a catalog of good pixels.

10. The method of claim 8, wherein the plurality of parameters of detector performance data include a catalog of pixel dark variance values.

11. The method of claim 8, wherein the plurality of parameters of detector performance data include a catalog of pixel saturation values.

12. The method of claim 8, wherein the plurality of parameters of detector performance data include a catalog of good pixels, wherein the plurality of parameters of detector performance data include a catalog of pixel dark variance values, and wherein the plurality of parameters of detector performance data include a catalog of pixel saturation values.

13. The method of claim 8, wherein the parameters of detector performance are cataloged prior to acquisition of the first set of images.

14. A method, comprising:
obtaining a plurality of frames of image data;
processing in a first processing stream a first subframe area within the plurality of frames of image data, wherein the first subframe area encompasses a first object, wherein the first subframe area includes a first set of pixels in a first frame of the plurality of frames of image data, and wherein the first subframe area includes a second set of pixels in a second frame of the plurality of frames of image data;
outputting a first aggregate image from the first processing stream;
processing in a second processing stream a second subframe area within the plurality of frames of image data, wherein the second subframe area encompasses a second object, wherein the second subframe area includes a third set of pixels in the first frame of the plurality of frames of image data, wherein the second subframe area includes a fourth set of pixels in the second frame of the plurality of frames of image data, wherein the first object is a stationary object, and wherein the second object is a moving object; and
outputting a second aggregate image from the second processing stream, wherein at least some steps of the first processing stream are performed while at least some steps of the second processing stream are performed.

15. An image sensor system, comprising:
a sensor assembly, including:
a lens assembly;
a shutter;
a detector having a plurality of pixels;
an inertial measurement unit;
a processor;
memory;
application programming;
object catalog data; and
detector performance parameter data, wherein the application programming is executed by the processor to control the sensor assembly to obtain a series of images,
wherein the application programming defines a first subframe that encompasses an area of the detector in which the object catalog data and inertial measurement unit data indicate a first object will appear,
wherein the application programming is executed to modify image data from the series of images and within the first subframe by application of the detector performance parameter data,
wherein the application programming is executed to aggregate the modified image data to provide a first output image that includes an image of the first object,
wherein the application programming defines a second subframe that encompasses an area of the detector in which the object catalog data and inertial measurement unit data indicate a second object will appear,
wherein the application programming is executed to modify image data from the series of images and within the second subframe by application of the detector performance parameter data,
wherein the application programming is executed to aggregate the modified image data to provide a second output image that includes an image of the second object,
wherein the first object is moving relative to the second object, and
wherein, between a first image of the series of images and a second image of the series of images, the first subframe moves relative to the second subframe.

16. The image sensor system of claim 15, wherein the object catalog data includes star catalog and resident space object ephemeris data.

* * * * *